US011182415B2

(12) United States Patent
Srirangamsridharan et al.

(10) Patent No.: US 11,182,415 B2
(45) Date of Patent: Nov. 23, 2021

(54) VECTORIZATION OF DOCUMENTS

(71) Applicant: International Business Machines Corporation, Armonk, NY (US)

(72) Inventors: Shreeranjani Srirangamsridharan, White Plains, NY (US); Raghu Kiran Ganti, Elmsford, NY (US); Mudhakar Srivatsa, White Plains, NY (US); Yeon-Sup Lim, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

(21) Appl. No.: 16/032,764

(22) Filed: Jul. 11, 2018

(65) Prior Publication Data

US 2020/0019618 A1 Jan. 16, 2020

(51) Int. Cl.
*G06F 16/31* (2019.01)
*G06F 16/33* (2019.01)
*G06K 9/00* (2006.01)
*G06F 16/93* (2019.01)
*G06F 40/40* (2020.01)
*G06F 40/20* (2020.01)

(52) U.S. Cl.
CPC ........ *G06F 16/3347* (2019.01); *G06F 16/313* (2019.01); *G06F 16/93* (2019.01); *G06F 40/20* (2020.01); *G06F 40/40* (2020.01); *G06K 9/00456* (2013.01); *G06K 9/00463* (2013.01)

(58) Field of Classification Search
None
See application file for complete search history.

(56) References Cited

U.S. PATENT DOCUMENTS

| | | | | |
|---|---|---|---|---|
| 7,535,477 B2 * | 5/2009 | Zaima | ................. | G06Q 10/107 345/603 |
| 7,836,356 B2 * | 11/2010 | Haas | .................... | G06F 11/008 714/47.1 |
| 2009/0116758 A1 * | 5/2009 | Shmelev | ............. | G06F 16/3347 382/234 |

(Continued)

OTHER PUBLICATIONS

Xu et al., "Improving Word Representations via Global Visual Context", NIPS Workshop on Learning Semantics, 2014, pp. 1-5.

(Continued)

*Primary Examiner* — Amresh Singh
(74) *Attorney, Agent, or Firm* — Cantor Colburn LLP; Joseph Petrokaitis

(57) ABSTRACT

Embodiments of the invention include method, systems and computer program products for document vectorization. Aspects include receiving, by a processor, a plurality of documents each having a plurality of word. The processor utilizing a vector embeddings engine generates a vector to represent each of the plurality of words in the plurality of documents. An image representation for each document in the plurality of documents is created and a word probability for each of the plurality of words in the plurality of documents is generated. A position for each word probability is determined in the image based on the vector associated with each word and a compression operation on the images is performed to produce a compact representation for the plurality of documents.

14 Claims, 5 Drawing Sheets

(56) References Cited

U.S. PATENT DOCUMENTS

| | | | |
|---|---|---|---|
| 2013/0304469 A1* | 11/2013 | Kamada | G06F 16/3347 |
| | | | 704/239 |
| 2014/0229476 A1* | 8/2014 | Fouad | G06F 16/355 |
| | | | 707/729 |
| 2015/0095017 A1 | 4/2015 | Mnih et al. | |
| 2015/0220833 A1 | 8/2015 | Le | |
| 2015/0254566 A1* | 9/2015 | Chandramouli | G06N 5/04 |
| | | | 706/11 |
| 2016/0328388 A1 | 11/2016 | Cao et al. | |
| 2017/0011289 A1 | 1/2017 | Gao et al. | |
| 2017/0116178 A1 | 4/2017 | Sridhar | |
| 2018/0032874 A1 | 2/2018 | Sanchez Charles et al. | |

OTHER PUBLICATIONS

Le et al., "Distributed Representations of Sentences and Documents," Proceedings of the 31st International Conference on International Conference on Machine Learning, vol. 32, 2014, 9 pages.

Liong et al, "Deep Hashing for Compact Binary Codes Learning," IEEE Conference on Computer Vision and Pattern Recognition (CVPR), 2015, pp. 2475-2483.

Manning et al., "The Stanford CoreNLP Natural Language Processing Toolkit," Proceedings of 52nd Annual Meeting of the Association for Computational Linguistics: System Demonstrations, Jun. 23-24, 2014, pp. 55-60.

Mikolov et al., "Distributed representations of Words and Phrases and their Compositionality," Advances in Neural Information Processing Systems 26, 2013, pp. 1-9.

Srirangamsridharan et al., "Doc2Img: A New Approach to Vectorization of Documents," 2018 21st International Conference on Information Fusion (FUSION), 2018, 7 pages.

* cited by examiner

VECTORIZATION OF DOCUMENTS

STATEMENT REGARDING FEDERALLY SPONSORED RESEARCH OR DEVELOPMENT

This invention was made with Government support under W911NF-16-3-0001 awarded by Army Research Office. The Government has certain rights to this invention.

BACKGROUND

The present invention generally relates to text classification problems, and more specifically, to vectorization of documents.

Natural language processing (NLP) is a field of computer science, artificial intelligence, and linguistics that, amongst other things, is concerned with using computers to derive meaning from natural language text. NLP systems may perform many different tasks, including, but not limited to, determining the similarity between certain words and/or phrases. One known way to determine the similarity between words and/or phrases is to compare their respective word embeddings. A word embedding (or "vector representation") is a mapping of natural language text to a vector of real numbers in a continuous space. Generally speaking, the word embeddings of similar words are located close to each other in the continuous space.

SUMMARY

Embodiments of the present invention are directed to a computer-implemented method for document vectorization. A non-limiting example of the computer-implemented method includes receiving, by a processor, a plurality of documents each having a plurality of word. The processor utilizing a vector embeddings engine generates a vector to represent each of the plurality of words in the plurality of documents. An image representation for each document in the plurality of documents is created and a word probability for each of the plurality of words in the plurality of documents is generated. A position for each word probability is determined in the image based on the vector associated with each word and a compression operation on the images is performed to produce a compact representation for the plurality of documents.

Embodiments of the present invention are directed to a system for document vectorization. A non-limiting example of the system includes receiving, by a processor, a plurality of documents each having a plurality of word. The processor utilizing a vector embeddings engine generates a vector to represent each of the plurality of words in the plurality of documents. An image representation for each document in the plurality of documents is created and a word probability for each of the plurality of words in the plurality of documents is generated. A position for each word probability is determined in the image based on the vector associated with each word and a compression operation on the images is performed to produce a compact representation for the plurality of documents.

Embodiments of the invention are directed to a computer program product for document vectorization, the computer program product comprising a computer readable storage medium having program instructions embodied therewith. The program instructions are executable by a processor to cause the processor to perform a method. A non-limiting example of the method includes receiving, by a processor, a plurality of documents each having a plurality of word. The processor utilizing a vector embeddings engine generates a vector to represent each of the plurality of words in the plurality of documents. An image representation for each document in the plurality of documents is created and a word probability for each of the plurality of words in the plurality of documents is generated. A position for each word probability is determined in the image based on the vector associated with each word and a compression operation on the images is performed to produce a compact representation for the plurality of documents.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
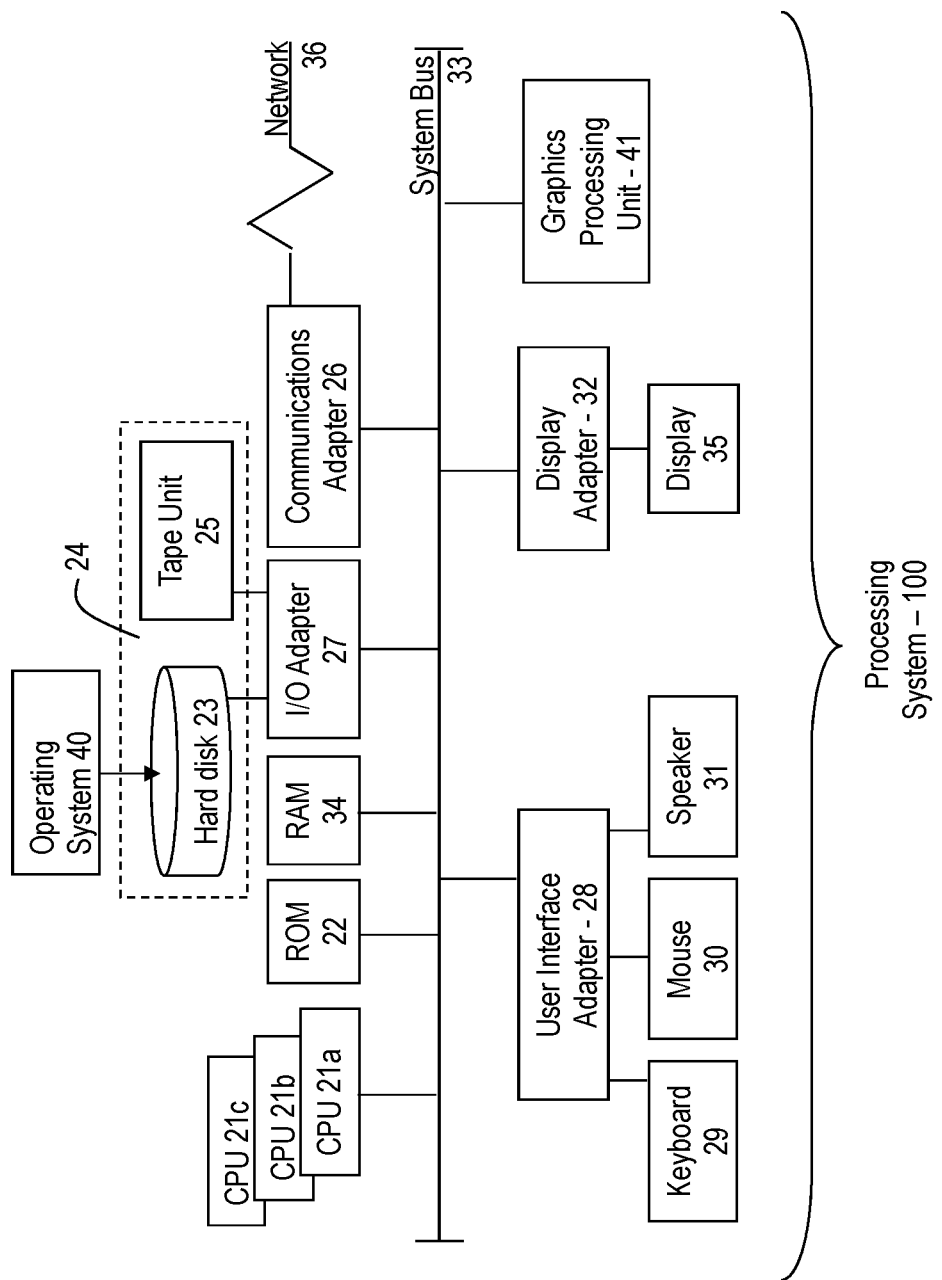
FIG. 1 depicts a block diagram of a computer system for use in implementing one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, vectorization of text documents can assist with various natural language processing (NLP) tasks such as, for example, sentiment analysis, natural language understanding, classification, and the like. Vectorization models such as Word2Vec attempt to learn word-vector representations from a large corpus of word documents, with similar words being close to each other in the vector space (and possibly with multiple degrees of similarity). Other models such as Doc2Vec learn document specific vector representations of words. That is to say, it extends the Word2Vec model by learning a vector representation of a word based on the document itself. However, the Doc2Vec model and other models do not capture the similarity between words across multiple documents.

Turning now to an overview of the aspects of the invention, one or more embodiments of the invention address the above-described shortcomings of the prior art by providing a vector-space embedding of documents approach that captures the context of a word in a document and captures the similarity between words across documents. Aspects of the invention include creating a word vector representations for each document and then treating the word vectors as a multi-dimensional image. For example, for n-dimensional word vectors, the model sets an image dimension of the document to be q×q, and each of the n-dimensional vectors is inserted into a cell (e.g., pixel) of the q×q image. In this example, by converting a document to an image, the words that are similar across documents are placed in the same spatial region of the image. For example, words like computer and laptop with similar vectors will tend to fall in the same cell. Further, the image can be compressed using a convolutional auto-encoder, where the lower dimensional vector for the documents is learned over the image. A goal of this auto-encoder is to preserve the contextuality of the document image while reducing the dimensionality. The model described herein can be referred to as a Doc2Img model.

Turning now to a more detailed description of aspects of the present invention, Referring to FIG. 1, there is shown an embodiment of a processing system 100 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

Figure 2:
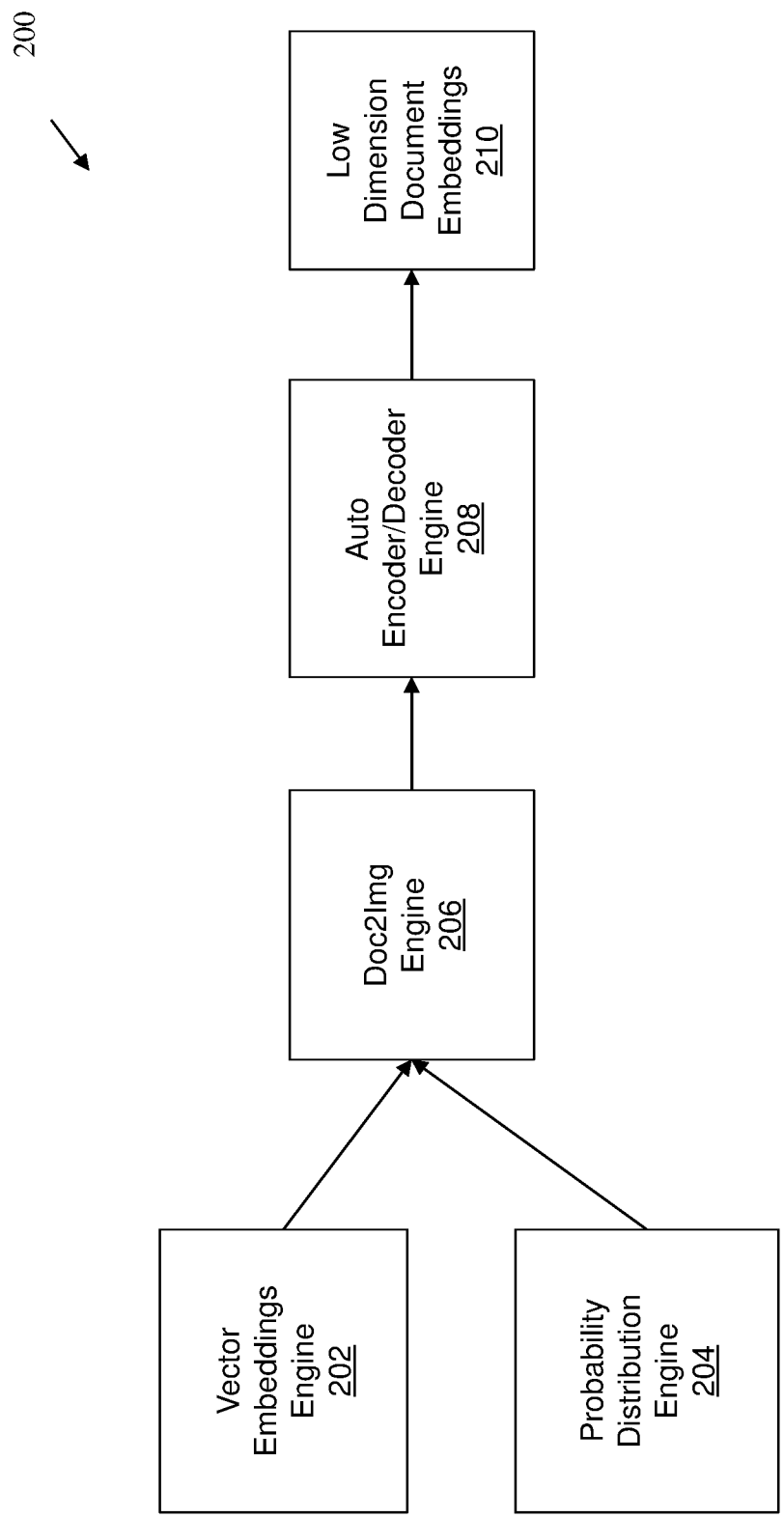
FIG. 2 depicts a system for document vectorization according to one or more embodiments of the invention.

FIG. 2 depicts a system 200 for document vectorization according to embodiments of the invention. The system 200 includes a vector embedding engine 202, a probability distribution engine 204, a Doc2Img engine 206, and an auto encoder/decoder engine 208, configured and arranged as shown. In embodiments of the invention, the engines 202, 204, 206, 208 are also implemented as so-called classifiers (descried in more detail below). In one or more embodiments of the invention, the features of the various engines/classifiers 202, 204, 206, 208 described herein can be implemented on the processing system 100 shown in FIG. 1, or can be implemented on a neural network (now shown). In embodiments of the invention, the features of the engines 202, 204, 206, 208 can be implemented by configuring and arranging the processing system 100 to execute machine learning (ML) algorithms. In general, ML algorithms, in effect, extract features from received data (e.g., inputs to the engines/classifiers 202, 204, 206, 208) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 202, 204, 206, 208 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilizes additional learning/training methods including, for example, clustering, anomaly detection, neural networks, deep learning, and the like.

In embodiments of the invention where the engines/classifiers 202, 204, 206, 208 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 200 can be implemented using the processing system 100 applies In one or more embodiments of the invention, the system 200 produces a lower dimensional vector for documents that preserves the contextuality of the documents. The system 200 receives multiple documents ($D_1 \ldots D_n$) as inputs into the vector embeddings engine 202, which creates a word embedding for every word in each of the multiple documents ($D_1 \ldots D_n$). In one or more embodiments of the invention, pre-processing of the documents can occur to remove "stop" words before or after word embedding occurs. Example stop words include words like "the," "a," "and," and "or." Also, "word embedding" refers to the process of producing an n-dimension vector for each word of a document and/or collection of information, and associating each word with its corresponding n-dimension vector. An n-dimension vector $\{v_1, v_2, v_3, v_4 \ldots, v_n\}$ can be considered to be a vector with an "n" number of values. Each vector can include a series of real numbers, as described in more detail below. The vector of a word can be an encoded representation of the word's meaning.

The meaning of a specific word (as represented by the word's vector) can be based at least on one or more other words that neighbor the specific word within the document/collection. Specifically, the words that neighbor the specific word can provide context to the specific word, and the neighboring words constitute a neighborhood of the specific word. The n-dimension vector of the specific word can be an aggregation of contributions from neighboring words towards the meaning of the specific word.

The n-dimension vector of each word can provide insights into the meaning of the specific word, especially when the vector is represented as a point in n-dimensional space. The relative positioning of each word's vector representation, within the n-dimension space, will reflect the relationships that exist between the words. For example, if two words have similar meanings, then the vector representations of the two words will appear relatively close to each other, or the vector representations of the two words will point in a similar directionality, when positioned in the n-dimensional space.

For example, if the vector representation of the word "CAT" and the vector representation of the word "KITTEN" are both positioned in n-dimension space, the vector representations will appear relatively close to each other, or the vector representations will point in a similar direction, because a logical relationship exists between the word "CAT" and the word "KITTEN." If the vector representations of the two words appear in close proximity to each other in the n-dimensional space (or point in a similar directionality in the n-dimensional space), then a logical relationship between these two words can be inferred.

In order to produce a vector representation of a word, embodiments of the invention can use one or more word-embedding model-producing programs. For example, embodiments of the invention can use one or more neural networks of the type previously described herein to perform word embedding. Embodiments of the invention can use model-producing programs such as, for example, Word2vec to produce a model in the form of vector representations. Embodiments of the invention can also use model-producing programs such as GloVe, Doc2Vec, and Paragraph2Vec, to produce the model in the form of vector representations. In order to produce a vector representation of a specific word within a document/collection, the neighborhood of the specific word is inputted into the one or more model-producing programs. For example, the sentences of the document/collection can be inputted into the model-producing program to produce a vector representation of the specific word that is based at least upon the inputs.

In one or more embodiments of the invention, the multiple documents ($D_1 \ldots D_n$) can be inputted into the probability distribution engine 204 to calculate the probability that a particular word will appear in a document. In one or more embodiments of the invention, the probability is determined by identifying the number of times a particular word appears in a document and dividing that number by the total number of words in the document to obtain a probability. The numerical value of the probability can be, for example, between 0 and 1.

In one or more embodiments of the invention, the Doc2Img engine 206 receives the word vectorization for the multiple documents ($D_1 \ldots D_n$) as well as the probabilities for each word appearing in a particular document. The Doc2Img engine 206 creates a Q×Q matrix for each of the documents ($D_1 \ldots D_n$) which is an image representation for each of the documents. The cells for each Q×Q matrix are populated with the word appearance probability. The location in the Q×Q matrix where the probability is placed is determined by the word vector, as described in more detail in FIG. 3b.

Figure 3A:
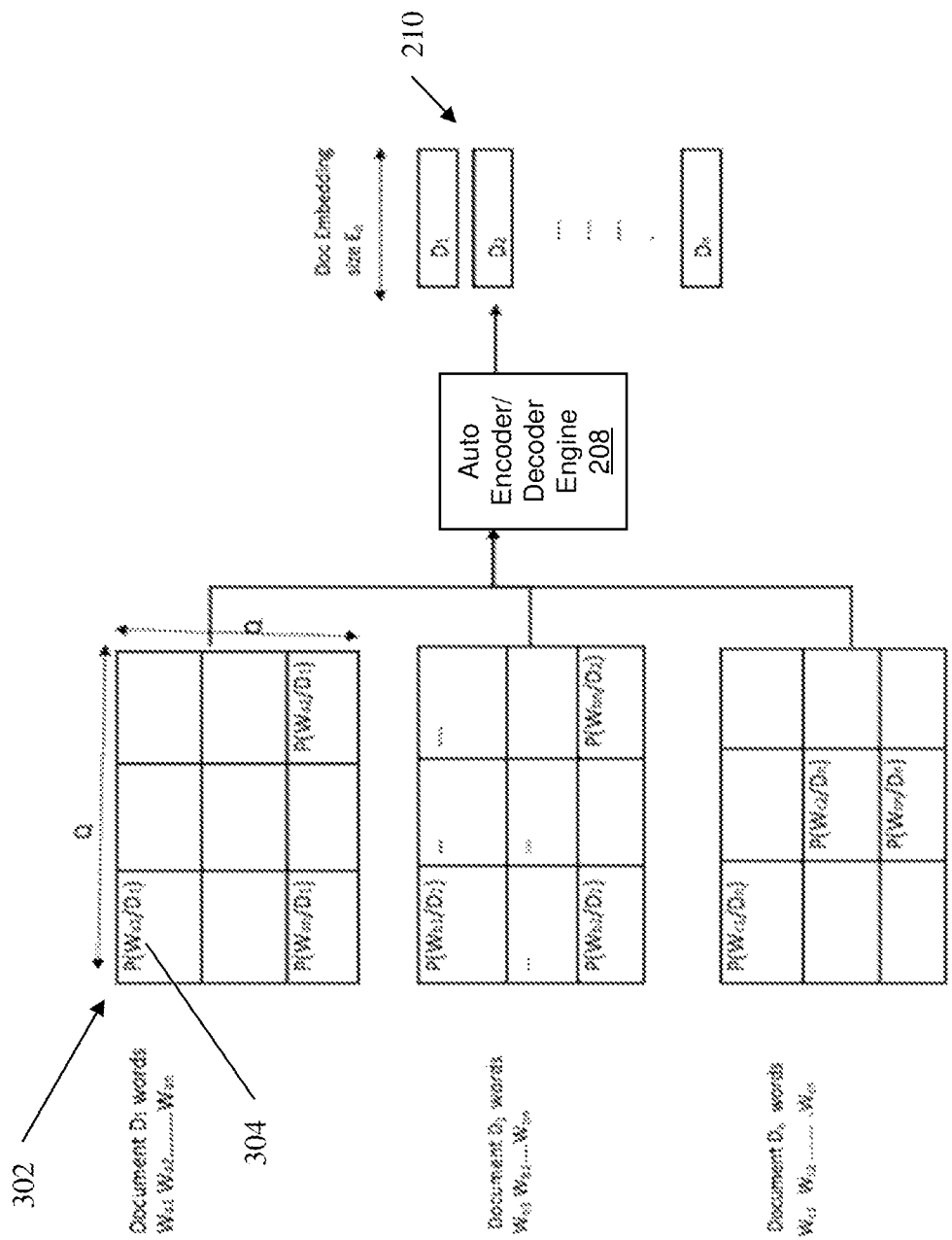
FIG. 3a depicts a diagram of the Q×Q matrixes for each document and the resultant low dimensional document embedding according to one or more embodiments of the invention.
Figure 3B:
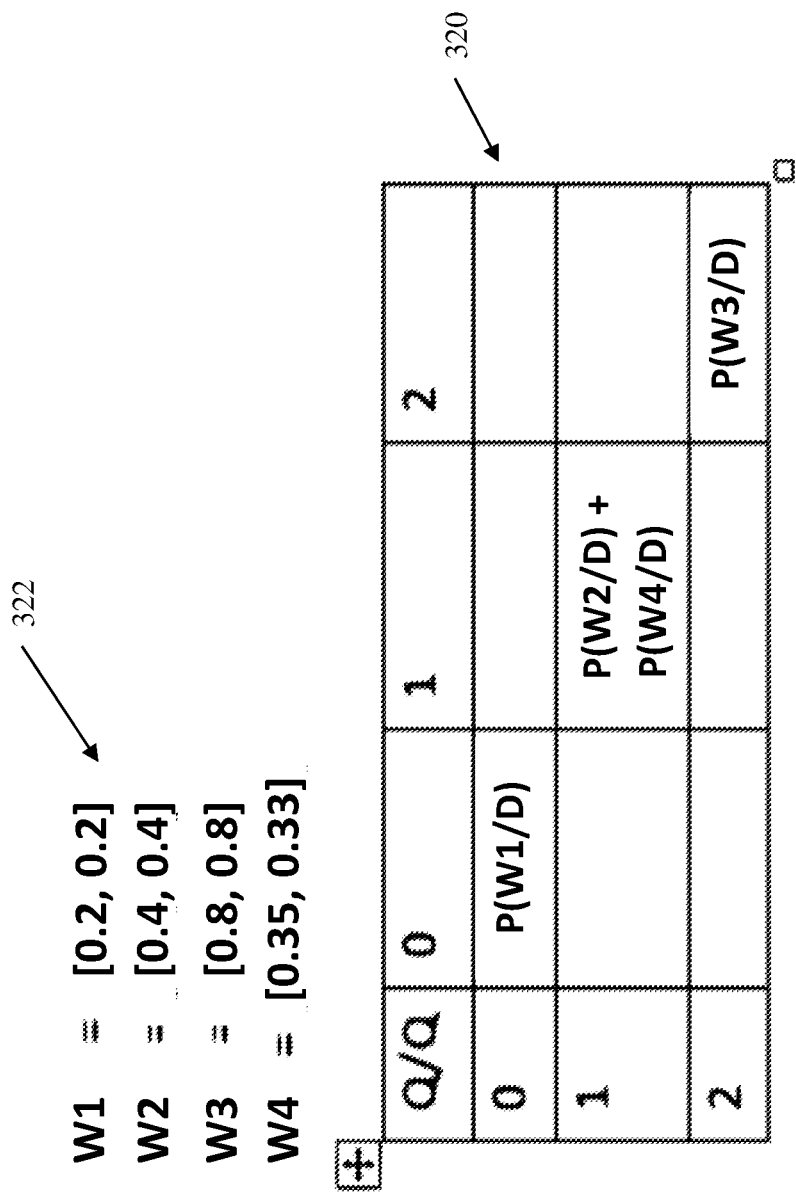
FIG. 3b depicts an example Q×Q matrix 400 for a document according to one or more embodiments of the invention.

FIG. 3a depicts a diagram of the Q×Q matrixes for each document and the resultant low dimensional document embedding according to one or more embodiments of the invention. A first Q×Q matrix 302 corresponds to a first document $D_1$ with word vectors $W_{a1}, W_{a2}, \ldots W_{an}$. The probability for word 1 (e.g., $W_1$) found in document $D_1$ corresponds to $P(W_{a1}/D_1)$ 304 and is placed in the cell in the first row, first column. FIG. 3b depicts an example Q×Q matrix 400 for a document according to one or more embodiments of the invention. The word vectors include W1, W2, W3, and W4 with their corresponding vectors shown at 402. The Q×Q matrix 400 is a 3×3 matrix with the word vectors 402 determining where to place the probabilities in the matrix 400. Word 1 (e.g., W1) has a vector including the values 0.2, 0.2. The cell location for the probability of word 1 is the first row and first column. The rows are divided into three rows and the location of the word vector is based on the value being either less than 0.333, between 0.333 and 0.667, or greater than 0.667. The same division can be utilized for the columns in the matrix 400. Using this delineation, the probabilities for W2, W3, and W4 are placed accordingly. The cell containing the probabilities for both W2 and W4 and are added together. The probability for W3 is placed in the cell corresponding to the third row, third column.

In FIG. 3a, a Q×Q matrix is built for each document and the probabilities are placed in corresponding cells based on the word vectors. The Q×Q matrixes are inputted into the auto encoder/decoder engine 208 which outputs a lower dimensional vector representation 210 of each of the documents ($D_1 \ldots D_n$). In an encoder-decoder framework, the encoder transforms an input into a lower-dimensional representation and a decoder is trained to reconstruct the original input. Auto encoders are used in solving many tasks like network pre-training, feature extraction, dimensionality reduction. For working with images, fully connected layers in auto encoder model are replaced with convolutional layers it is called a convolutional auto encoder. In this disclosure, we use convolutional auto encoders are we are compressing image representations of documents into vectors.

Figure 4:
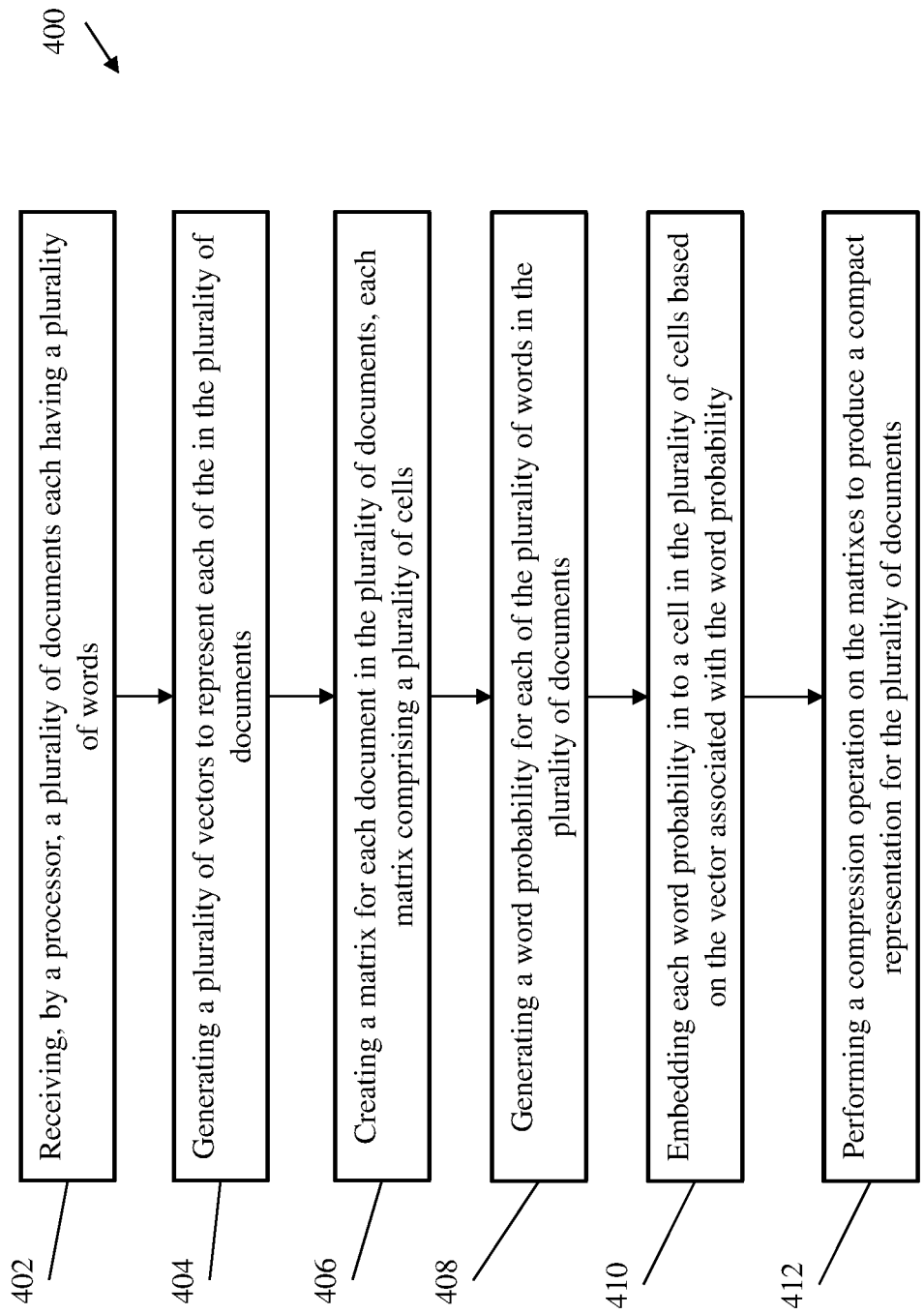
FIG. 4 depicts a flow diagram of a method for document vectorization according to one or more embodiments of the invention.

FIG. 4 depicts a flow diagram of a method for document vectorization according to one or more embodiments of the invention. The method 400 includes receiving, by a processor, a plurality of documents each having a plurality of words, as shown in block 402. At block 404, the method 400 includes generating, by the processor utilizing a vector embeddings engine, a vector to represent each of the plurality of words in the plurality of documents. The method 400, at block 406, includes creating an image representation for each document in the plurality of documents. At block 408, the method 400 includes generating a word probability for each of the plurality of words in the plurality of documents. The method 400, at block 410, includes determining a position for each word probability in the image based on the vector associated with each word. And at block 412, the method 400 includes performing a compression operation on the images to produce a compact representation for the plurality of documents.

Additional processes may also be included. It should be understood that the processes depicted in FIG. 4 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for document vectorization, the method comprising:
    receiving, by a processor, a plurality of documents each having a plurality of words;
    generating, by the processor utilizing a vector embeddings engine, a plurality of vectors, wherein each vector in the plurality of vectors represent each word of the plurality of words in the plurality of documents, wherein each vector corresponds to an encoded representation of a word within the plurality of documents;
    generating a word probability for each of the plurality of words in the plurality of documents;
    creating a document image representation for each document in the plurality of documents by creating a Q×Q image comprising a plurality of cells, wherein each cell in the plurality of cells corresponds to a pixel in a plurality of pixels of the Q×Q image;
    plotting, by the processor using a machine learning algorithm, each vector in the plurality of vectors in a cell of the plurality cells in the Q×Q image, wherein at least one cell in the plurality of cells includes a word probability associated with at least one word in a document; and
    performing a compression operation on each of the document images to produce a compact representation for the plurality of documents, wherein the compression operation is performed by a convolutional auto-encoder, and wherein the compact representation for the plurality of documents comprises a document vector for each document in the plurality of documents.

2. The computer-implemented method of claim 1 further comprising removing stop words from each of the plurality of documents prior to producing the plurality of vectors.

3. The computer-implemented method of claim 1, wherein each vector corresponds to an encoded representation of a word within the plurality of documents.

4. The computer-implemented method of claim 1, wherein generating the plurality of vectors is performed by a Word2Vec model.

5. The computer-implemented method of claim 1, wherein:
each image comprises a plurality of cells; and
the position for each word corresponds to a cell in the plurality of cells.

6. A computer program product for document vectorization, the computer program product comprising a computer readable storage medium having program instructions embodied therewith, the program instructions executable by a processor system to cause the processor system to perform a method comprising:
receiving, by the processor, a plurality of documents each having a plurality of words;
generating, by the processor utilizing a vector embeddings engine, a plurality of vectors, wherein each vector in the plurality of vectors represent each word of the plurality of words in the plurality of documents, wherein each vector corresponds to an encoded representation of a word within the plurality of documents;
generating a word probability for each of the plurality of words in the plurality of documents;
creating a document image representation for each document in the plurality of documents by creating a Q×Q image comprising a plurality of cells, wherein each cell in the plurality of cells corresponds to a pixel in a plurality of pixels of the Q×Q image;
plotting, by the processor using a machine learning algorithm, each vector in the plurality of vectors in a cell of the plurality cells in the Q×Q image, wherein at least one cell in the plurality of cells includes a word probability associated with at least one word in a document; and
performing a compression operation on each of the document images to produce a compact representation for the plurality of documents, wherein the compression operation is performed by a convolutional auto-encoder, and wherein the compact representation for the plurality of documents comprises a document vector for each document in the plurality of documents.

7. The computer program product of claim 6 further comprising removing stop words from each of the plurality of documents prior to producing the plurality of vectors.

8. The computer program product of claim 6, wherein each vector corresponds to an encoded representation of a word within the plurality of documents.

9. The computer program product of claim 6, wherein generating the plurality of vectors is performed in a Word2Vec model.

10. The computer program product of claim 6, wherein:
each image comprises a plurality of cells; and
the position for each word corresponds to a cell in the plurality of cells.

11. A system for document vectorization, the system comprising:
a memory; and
a processor system communicatively coupled to the memory:
wherein the processor system is configured to perform a method comprising:
receiving a plurality of documents each having a plurality of words;
generating, by the processor utilizing a vector embeddings engine, a plurality of vectors, wherein each vector in the plurality of vectors represent each word of the plurality of words in the plurality of documents, wherein each vector corresponds to an encoded representation of a word within the plurality of documents;
generating a word probability for each of the plurality of words in the plurality of documents;
creating a document image representation for each document in the plurality of documents by creating a Q×Q image comprising a plurality of cells, wherein each cell in the plurality of cells corresponds to a pixel in a plurality of pixels of the Q×Q image;
plotting, using a machine learning algorithm, each vector in the plurality of vectors in a cell of the plurality cells in the Q×Q image, wherein at least one cell in the plurality of cells includes a word probability associated with at least one word in a document; and
performing a compression operation on each of the document images to produce a compact representation for the plurality of documents, wherein the compression operation is performed by a convolutional auto-encoder, and wherein the compact representation for the plurality of documents comprises a document vector for each document in the plurality of documents.

12. The system of claim 11 further comprising removing stop words from each of the plurality of documents prior to producing the plurality of vectors.

13. The system of claim 11, wherein each vector corresponds to an encoded representation of a word within the plurality of documents.

14. The system of claim 11, wherein generating the plurality of vectors is performed in a Word2Vec model.

* * * * *